United States Patent
Goobich

(10) Patent No.: US 6,911,484 B1
(45) Date of Patent: Jun. 28, 2005

(54) EXPANDING MEDIUM, SYSTEM AND METHOD FOR DECORATING SURFACES

(75) Inventor: Joel Goobich, Duluth, GA (US)

(73) Assignee: Earlychildhood.com LLC, Monterey, CA (US)

( * ) Notice: Subject to any disclaimer, the term of this patent is extended or adjusted under 35 U.S.C. 154(b) by 333 days.

(21) Appl. No.: 09/624,708

(22) Filed: Jul. 25, 2000

(51) Int. Cl.$^7$ .................................. C08J 9/28

(52) U.S. Cl. .................. 521/72; 106/122; 252/401; 252/407; 521/65

(58) Field of Search .................. 252/401, 407; 521/65, 72; 106/122

(56) References Cited

U.S. PATENT DOCUMENTS

| | | | |
|---|---|---|---|
| 3,740,356 A | * 6/1973 | Munoa et al. .................. 521/64 |
| 3,778,364 A | 12/1973 | Mani et al. ............. 204/159.15 |
| 3,784,499 A | * 1/1974 | Krupnick et al. ............ 523/219 |
| 3,914,485 A | * 10/1975 | Curtis .......................... 428/71 |
| 4,006,273 A | 2/1977 | Wolinski et al. ............. 427/278 |
| 4,194,026 A | 3/1980 | Goodale et al. ............. 427/244 |
| 4,226,754 A | 10/1980 | Yun et al. ............. 250/29.6 TA |
| 4,401,712 A | 8/1983 | Morrison ..................... 428/289 |
| 4,863,782 A | 9/1989 | Wang et al. ................. 428/204 |
| 4,980,391 A | 12/1990 | Kumar et al. .................. 524/45 |
| 5,157,063 A | 10/1992 | Wetherell ..................... 524/55 |
| 5,312,481 A | 5/1994 | Greiner ....................... 106/157 |
| 5,484,815 A | 1/1996 | Petersen et al. ............... 521/56 |
| 5,558,816 A | 9/1996 | Payne .................... 252/400.62 |
| 5,562,451 A | 10/1996 | Wilcox et al. ................. 434/84 |
| 5,594,048 A | * 1/1997 | Weder et al. ................ 523/335 |
| 5,846,622 A | * 12/1998 | Imaeda ...................... 428/40.1 |
| 5,888,642 A | 3/1999 | Meteer et al. ............ 428/313.5 |
| 5,931,999 A | 8/1999 | Aisner ........................ 106/436 |
| 5,968,606 A | * 10/1999 | Osuna et al. ............... 427/510 |

FOREIGN PATENT DOCUMENTS

GB  2 130 591  * 6/1984

OTHER PUBLICATIONS

Jones Tones Fabric Paints And Accessories, Internet Site of Publication: http://www.nwent.co.uk/bramwell/jones.htm, Jun. 26, 2000.
Expancel Inc., Material Safety Data Sheet For Expancel 007 WU, (undated).
Expancel Inc., Material Safety Data Sheet For Expancel 642 WU, (undated).

(Continued)

*Primary Examiner*—Allan R. Kuhns
(74) *Attorney, Agent, or Firm*—Haverstock & Owens LLP

(57) ABSTRACT

The invention is a decorating medium, system and method for producing relief art on substrate surfaces. The decorating medium is an acrylic emulsion based medium containing an expandable polymer which expands the medium upon heating. The acrylic emulsion is produced with a mixture of an acrylic binder and an acrylic thickener or a cellulosic thickener combined in the appropriate range to obtain a medium rheology suitable for controlled application of the medium to the substrate surfaces. The decorating medium is applied to a substrate surface in a desired pattern either directly from a storage bottle or tube equipped with a nozzle or with an applicator such as a brush, a sponge, a knife or spatula. The desired pattern is achieved by free hand or by using a stencil or mask. After the decorating medium is applied to the surface of the substrate in the desired pattern, the medium is cured and heated. The heat causes the medium to expand and creates the relief art on the surface of the substrate. The relief art is flexible after curing and may be painted or decorated according the needs and taste of the artist. In an alternative embodiment of the invention, the decorating medium is mixed with decorating additives of choice such as pigments, colorants or glitters, prior to curing and heating the medium. The medium, the system and the method of the current invention are particularly useful for creating relief art on cloth or fabric substrates, but are also suitable for creating relief art on other substrate surfaces including metal, plastic, paper, cardboard and glass surfaces.

19 Claims, 4 Drawing Sheets

OTHER PUBLICATIONS

Dapro Foam Suppressors, "For Aqueous Coatings, Inks And Adhesives", (Technical Data Sheet), (undated).

Vitko, Foam Control Agents "Bubble Breaker", (Product Summary Publication), (undated).

Rohm And Haas Company, For Paper, Textiles, Nonwovens, Highloft "Acrysol ASE–60" (Technical Data Sheet) Mar., 1995.

Rohm And Haas Company, For Paper, Textiles, Nonwovens, Highloft "Acrysol TT–615" (Technical Data Sheet) 1985.

Rohm And Haas Company, "Material Data Sheet For Acrysol ASE–60 Rheology Modifier" Mar. 17, 1999, p. 1–6.

Rohm And Haas Company, a Selection Guide, "Acrysol Thickeners And Rheology Nodifiers" Feb., 1998.

BFGoodrich Company, Speailty Polymers & Chemicals Division, "Carbopol, High Performance Polymers" (Technical Data Sheet), (undated).

BFGoodrich Company, Specialty Additives, "Carbopol EZ–2 Polymer For Industrial Applications" (Technical Data Sheet) May, 1997.

Air Products, "Material Safety Data Sheet For Airflex 728 Emulsion" Sections 1–15, (undated).

Air Products, "Flexbond 381 Emulsion Polymer For Architectual Coatings", "Airflex 809 Vinyl Acetate–Ethylene Emulsion Polymer For Low VOC, Low Odor Interior Paints", "Airflex 728 Vinyl Acetate Chloride–Ethylene Emulsion Terpolymer For Interior And Exterior Paints" (Product Summary Publication), (undated).

Air Products, "High–Quality Emulsion Polymers for Paints and Coatings" Internet Site of Publication: http://www.airproducts.com/chemicals/ploycoat.html, Mar. 27, 2000.

Air Products, "Material Safety Data Sheet For Airflex 809 Emulsion" Sections 1–15, (undated).

Ultra Technical Data, "Dee FO 97–3, General Purpose Antifoam/Defoamer For Industrial Aqueous Systems" (Technical Data Sheet) Revised Jan. 19, 1994, Previously Revised Feb. 16, 1993.

Ultra Technical Data, "Dee FO 3010A, Antifoam/Defoamer Especially Designed And Developed For Use With Associative Thickeners" (Technical Data Sheet) Revised Oct. 11, 1993, Previously Revised Dec. 31, 1991.

Huls America Inc., Industrial Biocides, Product Data Bulletins, "Nuosept 495 Preservative", "Nuosept 95 Preservative", "Nuocide 404D", (undated).

ICI Biocides, Product Information Bulletin, "Proxel GXL Antimicrobial", (undated).

Zeneca Biocides, "Proxel GLX Preservative" (Technical Data Sheet), (undated).

Nipa Laborotories Inc., "Phenonip Liquid Preservative" (Technical Data Sheet), (undated).

Nipa Laborotories Inc., "Material Data Sheet for Phenonip", (undated).

Rohm And Haas Company, Kathon® CG Product Literature, (undated).

* cited by examiner

EXPANDING MEDIUM, SYSTEM AND METHOD FOR DECORATING SURFACES

FIELD OF THE INVENTION

The present invention relates to a medium, a system and a method for decorating surfaces. More specifically, this invention relates to a medium, a system and a method for decorating surfaces with relief art.

BACKGROUND OF THE INVENTION

Artists create relief art or three dimensional art by crafting or working a malleable material, such as clay, into a desired shape. Relief art is also created by cast and molding a material into a desired shape using a cast or die. Relief structure is added to paintings and painted surfaces by applying more or less of a malleable or pliable pigment medium, such as an oil base paint, and sculpting the pigment material with a knife or a brush to produce the desired appearance and texture. Oil based paints are used in relief paintings because they do not shrink significantly during drying and aging. However, oil based paints are typically expensive and require the use of solvent to clean up after usage or spillage. Thus, oil based paints are not well suited for use by adolescents and small children.

Decorative relief art gives three dimensional structure to a wide variety of coverings including floor coverings, counter tops, cabinets, wall paper and the like. Decorative relief art is typically produced on these materials by embossing their surfaces with a negative mask under pressure or under heat and pressure to produce the desired three dimensional structure and texture. Embossing methods are used to provide relief art on wood surfaces, some plastic surfaces and paper surfaces. Embossing methods are generally not suitable for producing relief art on very hard brittle surfaces, such as the surfaces of glass, or very soft resilient surfaces, such the surface of fabrics and cloths.

Producing relief art on a surface of a clothing article is particularly challenging because the relief art used must be able to bend and flex along with the clothing over several repeated deformations. Further, the relief medium used must adhere strongly to the cloth or the fabric of the clothing and must be resilient enough to withstand washing machine conditions. Therefore, there is a need to provide a versatile decorating medium, system and method for producing relief art on a wide variety of substrate surfaces including cloth and fabric surfaces.

SUMMARY OF THE INVENTION

The present invention is a decorating medium, a system and a method for providing relief art on substrate surfaces. Suitable surfaces are metal, fabric, cloth, glass, cardboard, paper or plastic. The decorating medium is a water-based emulsion and contains a expanding agent which causes the decorating medium to expand upon curing and heating. The expanded medium is resilient and flexible and is particularly well suited for providing relief art to cloth or fabric substrates.

According to the current invention, the decorating medium is applied to the surface in a desired pattern. The medium is applied directly to the substrate surface through a storage tube or bottle with a nozzle, with the aid of a brush, a knife, a spatula or with the hands and fingers of the artist. The desired pattern is achieved by free-hand painting or by using a stencil, a mask, masking materials or any combination thereof. After the medium is applied to the substrate surface with the desired pattern, the medium is cured by heating. Upon heating the decorating medium expands to produce relief art on the surface of the substrate. The decorating medium is allowed to dry before curing and heating or, alternatively, is heated and cured immediately after being applied to the substrate surface. The decorating medium is preferably cured and heated with an ironing device typically used to press clothing and the like, but may also be cured and heated with any suitable heating device including a microwave oven, a heat gun, a furnace, a conventional oven or a hot plate. Once the relief art is created, the relief art is then decorated according to the artist's needs and taste.

According to an alternative embodiment of the current invention, the decorating medium is mixed with a decorating additive prior to its application on to the substrate surface. The decorating additive is a pigment, such as ink, dye, food coloring, acrylic paint, finger paint, tempera paint or is a glitter material or other decorative material that is compatible with the decorating medium and which alters its appearance after curing. According to this embodiment, the decorating mixture of the decorating additive and the decorating medium is applied to the substrate surface in a preferred pattern as described above. The mixture is then cured and heated to produce the relief art on the substrate surface, which is then further decorated according to the artist's needs and taste.

The decorating medium of the current invention is preferably a water-based medium with an acrylic emulsion body that provides the medium with the desired viscosity and rheology. The medium also has an expanding agent that expands the decorating medium upon curing and heating. The expanding agent is an expandable polymer encapsulating a blowing agent. The expanding agent is preferably Polyvinylidene Chloride containing an alkane blowing agent therein, but alternatively may be any other heat expandible polymer system known in the art.

The decorating medium of the current invention is preferably made by mixing an acrylic binder with an antifoaming agent and then mixing in the expanding agent. An acrylic thickener or a cellulosic thickener is then added to the mixture of the acrylic binder and the antifoaming agent and the pH of the total mixture is adjusted to provide the desired viscosity and rheology for the medium. The decorating medium also preferably includes a preservative to prevent fungal or bacterial growth during storage of the decorating medium.

DETAILED DESCRIPTION OF A PREFERRED EMBODIMENT

Figure 1:
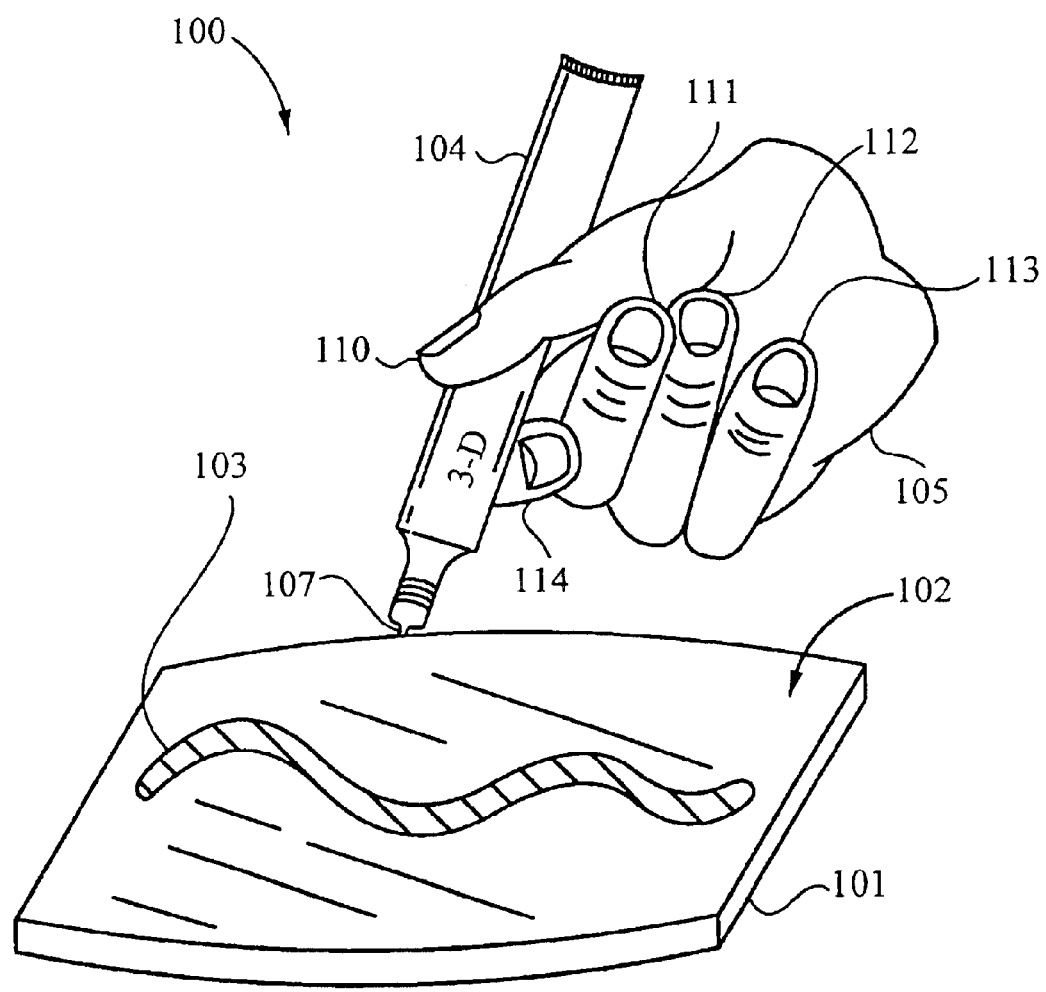
FIG. 1 illustrates the application of the decorating medium of the current invention to a substrate.

FIG. 1 is a perspective view 100 of an artist's hand 105 applying the decorating medium 107 of the current invention onto the surface 102 of a substrate 101. Preferably, the decorating medium 107 is provided in a tube 104 or a container suitable for dispensing the medium therefrom. For example, the container 104 is a plastic container with a tapered nozzle or is any dispensing container suitable for the application at band. The medium 107 is dispensed onto the surface 102 of the substrate 101 in a desired pattern 103. The decorating medium 107 is either dispensed directly on the surface 102 of the substrate 101 or is applied to the substrate surface 102 with the aid of an applicator such as a brush, a knife, a spatula (not shown) or the digits 110, 111, 112, 113, 114 of an artist's hand 105. The desired pattern 103 is created by the artist using any suitable method including free-hand method. Alternatively, the artist creates the desired pattern 103 with the aid of a stencil, a mask or masking materials (not shown). The substrate 101 is flexible or rigid and is formed from metal, plastic, wood, paper, glass, cloth, fabric or any other suitable substrate. According to the preferred embodiment of the present invention, the decorating medium 107 is formulated to have good adhesion and to have the appropriate viscosity for producing relief art on the surfaces of cloth or fabric materials such as a shirt.

Figure 2:
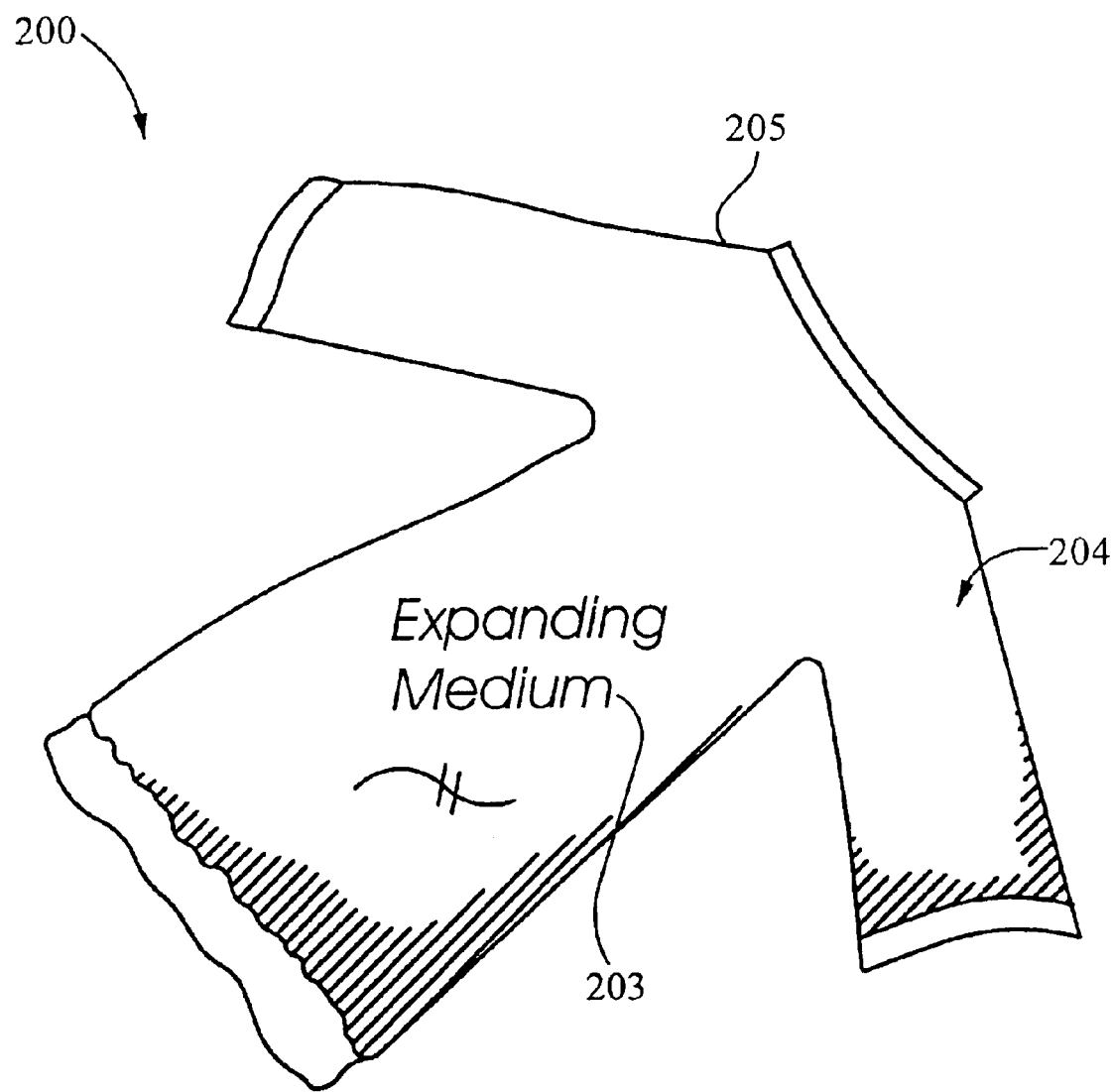
FIG. 2 illustrates a clothing article with relief art according to the present invention.

FIG. 2 illustrates a perspective view 200 of a shirt 205 that is decorated with the decorating medium according to the method of the present invention. The decorating medium of the current invention is readily used to create letters, words or phrases, such as the art 203. The medium is applied to the cloth surface 204 of the shirt 205. The shirt is then placed in a microwave oven and the medium is heated until it has expanded and cured. The letters of the relief art 203 are adhered to the shirt 205 and are sufficiently flexible to withstand several repeated deformations. The medium of the current invention is also well suited to create more elaborate relief art on the surfaces of cloth and clothing including scenery and/or flowers.

The preferred formulation for the decorating medium of the current invention includes an emulsion body that gives the medium the appropriate viscosity and rheology for decorating cloth and fabric substrates. The viscosity of the decorating medium is preferably in the range of 3,000 to 25,000 centipoise. The emulsion body is preferably an acrylic emulsion body formed by incorporating an emulsion binder and an emulsion thickener or a cellulosic thickener together. The emulsion body provides for the substantiative physical properties of the decorating medium and allows the decorating medium to expand upon curing and heating. The decorating medium also contains an expanding agent which causes the expansion of the decorating medium during heating. The expanding agent is an expandible polymer that encapsulates a blowing agent, as described in detail below.

Suitable acrylic binders include Vinyl Acrylic emulsions and Vinyl Acetate polymer emulsions that preferably make up 50 to 95% of the total weight of the decorating medium. Good results have been obtained with AIRFLEX® 809, AIRFLEX® 728 and FLEXBOND® 381 polymer emulsions manufactured by Air products and Chemical, Inc.; Air Products Polymers, L. P., 7201 Hamilton Blvd., Allentown, Pa. 18195. AIRFLEX® 809 Polymer Emulsion is a Vinyl Acetate-Ethylene Polymer with particle sizes in the range of 0.15 to 0.30 microns and is sold as an emulsion solution in 40 to 60% water by weight. AIRFLEX® 728 Polymer Emulsion is a Vinyl Acetate-Vinyl Chloride-Ethylene Terpolymer emulsion with average particle sizes of 0.17 micron and is sold as an emulsion solution in 40 to 60% water by weight. FLEXBOND® 381 Emulsion contains a Vinyl-Acrylic Polymer with particle sizes in a range of 0.10 to 0.30 micron and is sold as an emulsion solution that is 55% solids in water. These emulsion binders described above are used as they are sold, and described herein, in the amount of between 25 to 95% and preferably between 25 to 95% of the total weight of the decorating medium.

Emulsion thickeners are pH sensitive emulsion polymers that are used to adjust the decorating medium rheology to reduce minimum sagging while setting, curing and heating. The emulsion thickener is preferably used in the range of 0.5 to 10% of the total medium weight. Thickeners are preferably Polyacrylic Acid thickeners, Alkali Swellable Emulsion thickeners or Hydrophobically modified Alkaline-Soluble thickeners, but can be any number of thickeners or rheology modifiers known in the art. Good results have been obtained with CARBOPOL® EZ-2 polymer thickener that is manufactured by BFGoodrich, 9911 Brecksville Road, Cleveland, Ohio 44141. CARBOPOL® EZ-2 polymer is a Polyacrylic Acid thickener that is sold as a white powder with an average molecular weight which is between 0.75 to 5.0 million. The ACRYSOL® Family of thickeners, including ACRYSOL® ASE 60 and ACRYSOL® TT-615 have also provided good results. Both ACRYSOL® ASE 60 and ACRYSOL® TT-615 are manufactured by Rohm and Haas Company, 100 Independence Mall West, Philadelphia, Pa. 19106. ACRYSOL® ASE 60 is an Acrylic Polymer thickener sold as 28% solids in water. ACRYSOL® TT-615 is a Hydrophobically Modified Alkilin-Soluble Emulsion sold as 30% solids in water.

While Acrylic thickeners are the preferred thickeners, good results have also been obtained with Cellulosic thickeners such as Natrosol® 250MR or CMC-T. The Cellulosic thickener Natrosol® 250MR is a hydroxyethyl cellulose and CMC-T is a sodium carboxymethyl cellulose; both of which are manufactured by Hercules, Aqualon Division, 1313 North Market Street, Wilmington, Del. 19894.

The expanding agent is preferably a Polyvinylidene Chloride polymer containing an alkane blowing agent. The expanding agent serves to provide three dimensional structure to the cured and expanded decorating medium. The expanding agent makes up 1.0 to 10% of the total weight of the decorating medium mixture. There are several known manufacturers of expanding agents suitable for use in the decorating medium of the current invention. Particularly good results have been obtained with Expancel 007WU, and Expancel 642 WU, manufactured by Expancel, Box 13000, 850 13 Sundsvall, SWEDEN. The Expancel products are Polyvinylidene Chlorides (polystyrene beads) with encapsulated Isobutane. The Expancel products are sold as a solution in 25% water by weight and the dried product is 20–30% blowing agent and less than 70% polystyrene.

The decorating medium preferably also contains a preservative that prevents fungus, bacteria and/or mold from growing in the aqueous-based decorating medium during storage. Preservatives are typically used in a range of 0.005 to 0.50% of the total weight of the decorating medium. Preservatives that are approved for use in childrens art products are the most preferred. Examples, of preservatives that are used in the preferred formulation of the decorating medium are NUOSEPT® 95 and NUOCIDE® 404D manufactured by HULS America, Inc., 220 Davidson Ave, Somerset, N.J. 08873. NUOSEPT® 95 is a mixture of 24.5% 5-Hydroxymethoxymethyl-1-aza-3,7-dioxabicyclo (3.3.0)ocatane, 17.7% 5-Hydroxymethyl-1-aza-3,7-dioxabicyclo(3.3.0)ocatane and 7.8% 5-Hydroxypoly [methyleneoxy-methyl-1-aza-3,7-dioxabicyclo(3.3.0) ocatane and 50% water. NUOCIDE® 404D is a mixture of 40.4% Tetrachlorisophthalonitrile 59.6% water. Alternatively PROXEL® GXL, manufactured by Zeneca Inc., 1800 Concord Pike, Wilmington, Del. 19897 which is a 17%

1,2-Benzisothiazolin-3-one and water solution also provides good results as well as Phenonip manufactured by NIPA Laboratories, Inc., 341 Silverside Road, 104 Hagley Building, Wilmington, Del. 19810 which is a mixture of 70% 2-Phenoxyethanol, 15% Methyl P-Hydroxybenzoate, 5% Ethyl P-Hydroxybenzoate, 5% Propyl P-Hydroxybenzoate, Butyl P-Hydroxybenzoate. It will be clear to one skilled in the art that any number of commercially available preservatives are suitable for preserving the water-based decorating medium of the present invention.

Figure 3:
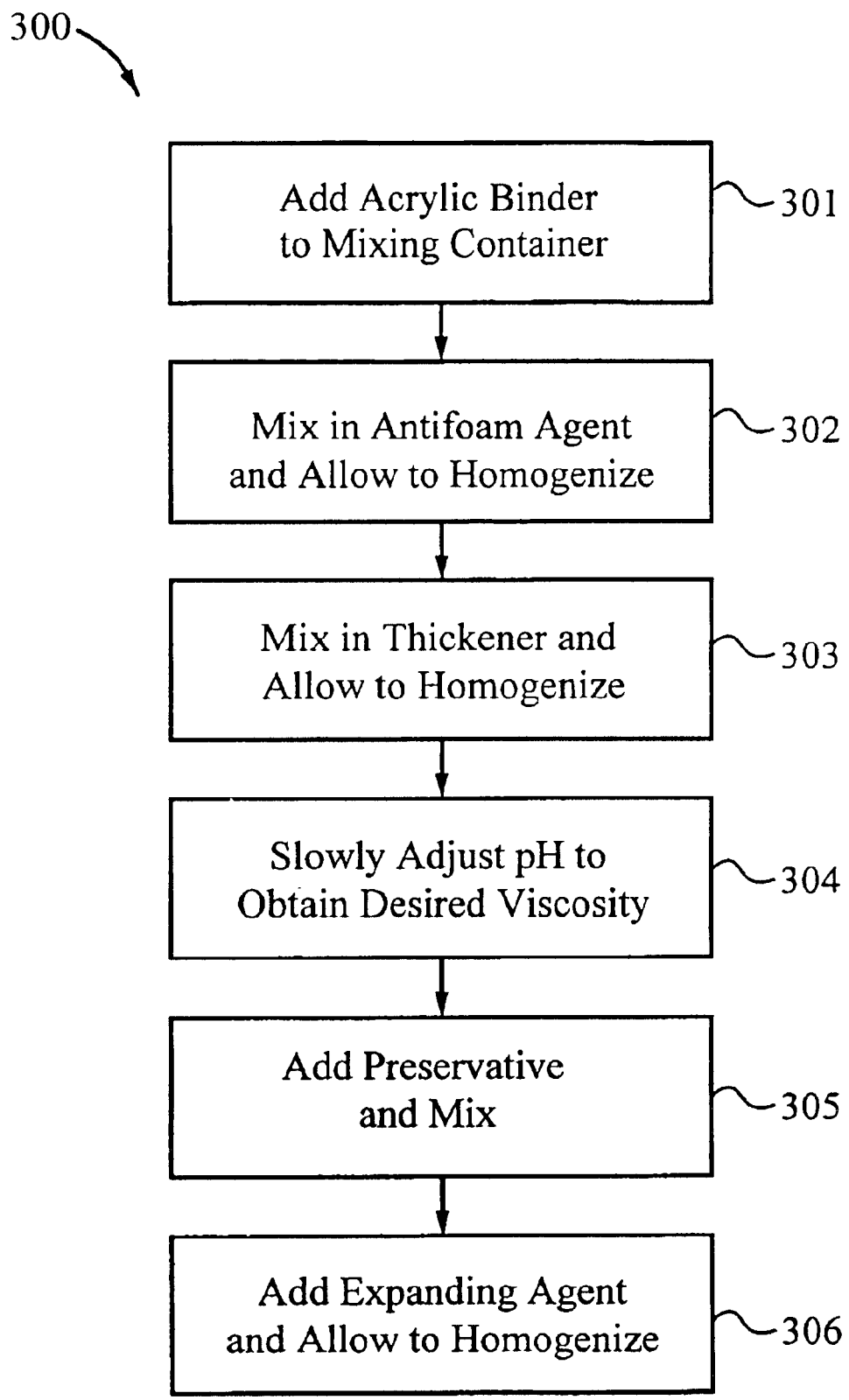
FIG. 3 illustrates the preferred method of making the decorating medium of the current invention.

FIG. 3 is a block-flow diagram 300 of the preferred method for preparing the decorating medium of the current invention. In the step 301, 500 mass units (±10%) of an Acrylic Binder is added to a suitable mixing vessel as a 40 to 60% water solution. In the step 302, approximately 2.0 mass units of an antifoaming agent is added to the Acrylic Binder and a high speed sheer mixer is used to homogenize the Acrylic Binder and antifoaming agent mixture. Any number of antifoaming agents suitable for use with an aqueous system are commercially available. The antifoaming agent prevents bubbles and "hot spots" from forming during high speed mixing that can have deleterious effects on the quality of the resultant decorating medium. Good results have been obtained with the Bubble Breaker® series of antifoaming agents produced by Witco Corporation, One American Lane, Greenwich, Conn. 06831 and DEE FO 97-3 or DEE FO 3010A antifoaming agents produced by Ultra Additives Incorporated 460 Starlight Street, Paterson, N.J. 07501. Silicone-based, modified silicone-based and reactive silica in mineral oil are also useful for reducing foaming and bubble formation during high speed mixing.

After the homogenizing step 302, then in the step 303 25 mass units of an Acrylic thickener is added into the mixing vessel continuously over a period of approximately 15–20 minutes and as the mixture is continuously stirred. In the step 304, the pH of the solution is adjusted with a basic solution to a pH in the range of 7.0 to 9.0, which causes the mixture to thicken to a viscosity of approximately 3,000 to 25,000 centipoise. Preferably, the basic solution used to adjust the pH of the mixture is a 20 to 40% by weight sodium hydroxide solution, but any typically basic solution will work to adjust the pH including a dilute solution of Borax. After the pH is adjusted to the range between 7.0 and 9.0 in the step 304, then in the step 305, a preservative is added to the decorating medium and the mixture is homogenized. After the preservative is mixed into the solution in the step 305, then in the step 306 25 mass units (±10%) of the expanding agent is added to the mixing vessel and the mixture is again homogenized. After the step 306, the medium is packaged in a suitable container as described previously. It will be clear to one skilled in the art that the preservative may be added at any time before or after the performing the steps 301–306 outlined in the block diagram 300. Further, the expanding agent can be added at any time after the step 301. It is important, however, that after the step of adding the expanding agent that the mixing vessel and the mixture contained therein is maintained at temperatures below 35 Celsius to prevent the expanding agent from activating.

Figure 4:
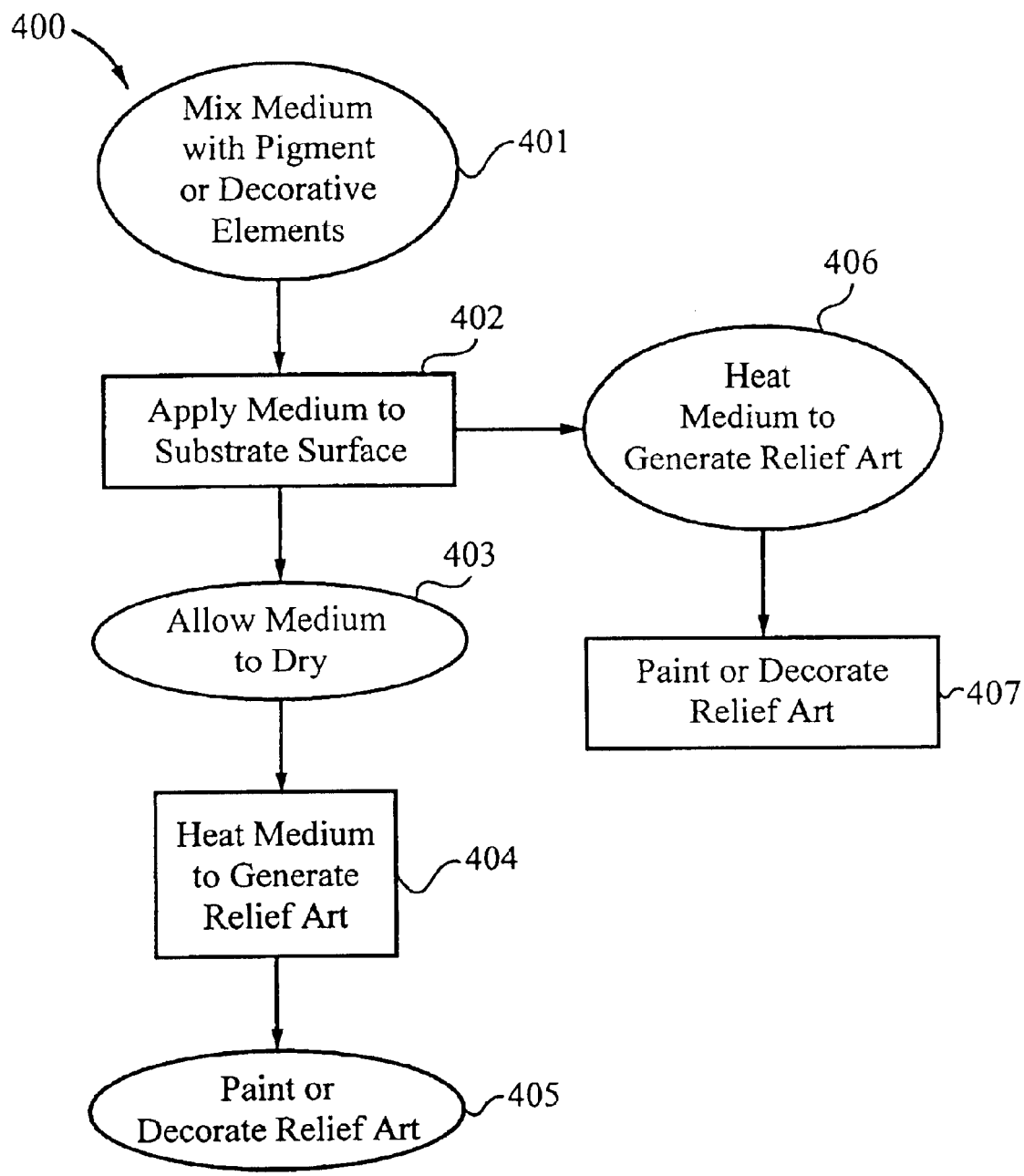
FIG. 4 illustrates a flow diagram for creating relief art on a substrate surface according to the method of the present invention.

FIG. 4 is a block-flow diagram 400 according to the method of decorating a substrate surface with relief art according to the present invention. In the step 401, the decorating medium is mixed with a decorating additive. The decorating additive is a glitter, a glitter paint, a pigment, a colorant or any combination thereof. Suitable colorant and pigments include, but are not limited to, inks, dyes, food coloring, acrylic paints and finger paints. In the step 402, the decorating medium and decorating additive mixture is applied to the surface of the substrate in a desired pattern using any method as described in relation to FIG. 1. Alternatively, in the step 402 the decorating medium is applied to the surface of the substrate in the desired pattern without performing the step 401 of mixing a decorating additive with the decorating medium.

After performing the step 402, then in the step 406, the decorating medium is cured and heated. Preferably, the decorating medium is heated at a temperature between 120 to 140 degrees Celsius for a period between 1–4 minutes. The heating needs to be sufficient to cause the expanding agent and the decorating medium to expand and generated the desired relief art. In the step 407, the relief art is decorated according to the artist's taste with paints, glitters and the like. In the step 406, the decorating medium is cured and heated with any heating device suitable for the application at hand including a microwave oven, a heat gun, a furnace, a conventional oven or a hot plate.

According, to an alternative embodiment of the invention, after performing the step 402, the decorating medium is allowed to dry in the step 403, prior to curing and heating the decorating medium in the step 404. In the step 404 the decorating medium is preferably heated at a temperature between 120 to 140 degrees Celsius for a period between 1–4 minutes. As in the step 406, the heating needs to be sufficient to cause the expanding agent and the decorating medium to expand and generated the desired relief art. The desired relief art that is created in the step 404 is then, in the step 405, decorated or painted according to the artist's needs and taste.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the decorating medium, the system and the method of present invention can be used to generate three dimensional art that is not attached to a substrate surface. For example, the decorating medium may be applied in a desired pattern on a removable substrate, wherein the relief art produced is removable from the substrate.

What is claimed is:

1. A decorating medium for creating relief art on a substrate surface, the medium comprising:
   a. a water-based emulsion body;
   b. an expandable polymer with a blowing agent encapsulated therein, wherein the medium is cured and expanded when heated after application to the substrate surface; and
   c. a preservative selected from the group consisting of Hydroxyalkl-1-aza-3,7- dioxabicyclo(3.3.0)octane, Tetrachlorisophthalonitrile 1,2-Benzisothiazolin-3-one, and Phenoxyethanol.

2. The decorating medium of claim 1, wherein the water-based emulsion body comprises an acrylic binder and an acrylic thickener.

3. The decorating medium of claim 2, wherein the acrylic binder is selected from the group consisting of Vinyl Acetate-Ethylene Polymer, Vinyl Acetate-Vinyl Chloride-Ethylene Terpolymer and a Vinyl-Acrylic Polymer.

4. The decorating medium of claim 2, wherein the acrylic binder is in the range of 25 to 95 percent of the total weight of the decorating medium.

5. The decorating medium of claim 2, wherein the decorating medium has a viscosity in a range of 3,000 to 25,000 centipoise in a range of 7.0 to 9.0.

6. The decorating medium of claim 2, wherein the acrylic thickener is in a range of 0.5 to 10% percent of the weight of the decorating medium.

7. The decorating medium of claim 1, wherein the preservative is in the range of 0.005 to 0.50 percent of total weight of the medium.

8. The decorating medium of claim 1, wherein the expandable polymer is a Polyvinylidene Chloride polymer encapsulating an alkane blowing agent.

9. The decorating medium of claim 8, wherein the blowing agent is Isobutane.

10. A system for decorating surfaces, the system comprising:
   a. a water based heat curable and expandable medium;
   b. a water compatible decorating additive for mixing with the heat curable and expandable medium; and
   c. a preservative selected from the group consisting of Hydroxyalkl-1-aza-3,7-dioxabicyclo(3.3.0)ocatane, Tetrachlorisophthalonitrile 1,2-Benzisothiazolin-3-one, Phenoxyethanol.

11. The system of claim 10, wherein the decorating additive is a coloring agent selected from the group consisting of ink, dye, food coloring, acrylic paint, finger paint and tempera paint.

12. The system of claim 10, wherein the water based heat curable and expandable medium comprises:
   a. an emulsion body comprising an acrylic binder and an acrylic thickener or a cellulosic thickener; and
   b. an expandable polymer with a blowing agent encapsulated therein, wherein the medium is cured and expanded when heated to temperatures below 140 Celsius.

13. The system of claim 12, wherein the acrylic binder is selected from the group consisting of Vinyl Acetate-Ethylene Polymer, Vinyl Acetate-Vinyl Chloride-Ethylene Terpolymer and Vinyl-Acrylic Polymer.

14. The system of claim 12, wherein the acrylic binder is in a range of 25 to 95 percent of a total weight of the medium.

15. The system of claim 12, wherein the decorating medium has a viscosity in a range of 3,000 to 25,000 centipoise in a pH range of 7.0 to 9.0.

16. The system of claim 13, wherein the acrylic thickener is in a range of 0.5 to 10 percent of a weight of the medium.

17. The system of claim 10, wherein the preservative is in a range of 0.005 to 0.50 percent of a total weight of the medium.

18. The system of claim 12, wherein the expandable polymer is a Polyvinylidene Chloride polymer emasculating an alkane blowing agent.

19. The system of claim 18, wherein the alkane blowing agent is Isobutane.

* * * * *

UNITED STATES PATENT AND TRADEMARK OFFICE
CERTIFICATE OF CORRECTION

PATENT NO. : 6,911,484 B1
DATED : June 28, 2005
INVENTOR(S) : Joel Goobich

It is certified that error appears in the above-identified patent and that said Letters Patent is hereby corrected as shown below:

Title page,
Item [56], References Cited, U.S. PATENT DOCUMENTS, replace "Yun et al. ……. 250/29.6 TA" with -- Yun et al. ……. 260/29.6 TA --.

Column 1,
Line 54, replace "Suitable surfaces arc" with -- Suitable surfaces are --.

Column 3,
Line 5, replace "application at band." with -- application at hand. --.

Column 7,
Line 2, replace "the range of" with -- a range of --.
Line 2, replace "the total weight" with -- a total weight --.
Line 6, replace "a range of 7.0" with -- a pH range of 7.0 --.

Signed and Sealed this

Thirtieth Day of August, 2005

JON W. DUDAS
*Director of the United States Patent and Trademark Office*